(12) United States Patent
Furuya et al.

(10) Patent No.: US 9,688,889 B2
(45) Date of Patent: Jun. 27, 2017

(54) SEALANT COMPOSITION FOR NONAQUEOUS ELECTROLYTE CELL

(71) Applicant: THREE BOND FINE CHEMICAL CO., LTD., Kanagawa (JP)

(72) Inventors: Kazuhiro Furuya, Kanagawa (JP); Kanako Morii, Kanagawa (JP)

(73) Assignee: THREE BOND FINE CHEMICAL CO., LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 14/432,649

(22) PCT Filed: Sep. 12, 2013

(86) PCT No.: PCT/JP2013/074750
§ 371 (c)(1),
(2) Date: Mar. 31, 2015

(87) PCT Pub. No.: WO2014/054406
PCT Pub. Date: Apr. 10, 2014

(65) Prior Publication Data
US 2015/0240131 A1    Aug. 27, 2015

(30) Foreign Application Priority Data
Oct. 2, 2012    (JP) .................................. 2012-220423

(51) Int. Cl.
| | |
|---|---|
| C09J 11/04 | (2006.01) |
| C09D 123/04 | (2006.01) |
| H01M 2/08 | (2006.01) |
| C09J 109/00 | (2006.01) |
| C08K 3/22 | (2006.01) |
| C08L 23/16 | (2006.01) |
| C08L 9/00 | (2006.01) |
| C08L 3/16 | (2006.01) |
| H01M 10/052 | (2010.01) |

(52) U.S. Cl.
CPC ................. *C09J 11/04* (2013.01); *C08K 3/22* (2013.01); *C08L 9/00* (2013.01); *C08L 23/16* (2013.01); *C09D 123/04* (2013.01); *C09J 109/00* (2013.01); *H01M 2/08* (2013.01); *C08K 2003/2289* (2013.01); *H01M 10/052* (2013.01)

(58) Field of Classification Search
CPC ....... C09J 11/04; C09J 109/00; C09D 123/04; H01M 10/05; H01M 2/08; H01M 10/052; Y02T 10/7011; C08K 2003/2289; C08L 23/16; C08L 9/00
See application file for complete search history.

(56) References Cited

U.S. PATENT DOCUMENTS

| | | | | |
|---|---|---|---|---|
| 4,948,006 A | * | 8/1990 | Okabe ................... | B29C 45/14 |
| | | | | 156/228 |
| 6,395,420 B1 | * | 5/2002 | Komatsu ............ | H01M 2/0212 |
| | | | | 429/127 |
| 2002/0106559 A1 | | 8/2002 | Takahashi et al. | |
| 2012/0183706 A1 | | 7/2012 | Kang et al. | |

FOREIGN PATENT DOCUMENTS

| | | | |
|---|---|---|---|
| CN | 1536047 A | | 10/2004 |
| GB | 880360 | * | 10/1961 |
| JP | 2000-235844 | | 8/2000 |
| JP | 2003-268293 | | 9/2003 |
| JP | 2007-273480 | * | 10/2007 .............. H01M 2/08 |
| JP | 2009-221421 | | 10/2009 |
| WO | 2011/034337 | | 3/2011 |

OTHER PUBLICATIONS

Ferro (Ferro Product Information 10446 Bright Blue {http://www.ferro.com/NR/rdonlyres/E1EDD83A-A415-4A01-A619-DE358B7447D6/2871/10446TDS.pdf}.*
PolymerProcessingDotCom (Online Feb. 25, 2001 {http://www.polymerprocessing.com/polymers/EPR.html}).*
International Search Report for PCT/JP2013/074750, dated Oct. 22, 2013, and English translation thereof.
International Preliminary Report on Patentability for PCT/JP2013/074750, dated Apr. 16, 2015, and English translation thereof.
Chinese Office Action dated Jul. 12, 2016 which issued in the corresponding Patent Application No. 201380051338.3, incl. English Translation.
Chinese Office Action dated Nov. 17, 2016 which issued in the corresponding Patent Application No. 201380051338.3, including English translation.
Chinese Office Action dated Mar. 8, 2017 which issued in the corresponding Patent Application No. 201380051338.3, including English translation.

* cited by examiner

*Primary Examiner* — Patrick Ryan
*Assistant Examiner* — Aaron Greso
(74) *Attorney, Agent, or Firm* — Dickinson Wright PLLC

(57) ABSTRACT

[Problem] An object of the present invention is to provide a sealant composition for a nonaqueous electrolyte cell in which the application position and uniformity of applied film thickness of the sealant can be visually confirmed even when being applied as a thin film, and having excellent durability in relation to various electrolytic solutions used in the cell.
[Solution] A sealant composition for a nonaqueous electrolyte cell, containing (A) an elastomer and (B) a cobalt blue colorant, in which the component (B) has a content of 0.1-20 mass parts with respect to 100 mass parts of the component (A).

5 Claims, No Drawings

SEALANT COMPOSITION FOR NONAQUEOUS ELECTROLYTE CELL

TECHNICAL FIELD

The present invention relates to a sealant composition for a nonaqueous electrolyte cell in which the application position and uniformity of applied film thickness of the sealant can be visually confirmed even when being applied as a thin film, and having excellent durability in relation to various electrolytic solutions used in the cell.

BACKGROUND ART

In recent years, portable electronic devices such as mobile phones and notebook-sized personal computers have become increasingly popular. These portable electronic devices widely use nonaqueous electrolyte cells such as a lithium-ion battery. In addition, also in the automobile industry, the nonaqueous electrolyte cells are attracting attention as power sources for electrically-powered cars and hybrid vehicles both of which cope with environmental problems.

Most nonaqueous electrolyte cells include an element unit in which a pair of electrodes are disposed to face each other with a separator therebetween; an electrolytic solution; and a container for accommodating them. In general, this container includes a metal case having an opening, and a sealing body for sealing the opening. Moreover, in order to ensure electrical insulation between the metal case and the sealing body, a gasket is sometimes interposed between them.

In a nonaqueous electrolyte cell, it is important to prevent infiltration of moisture into the element since moisture has an adverse effect on the electrolytic solution (in particular, on the electrolyte) and the electrodes. In addition, it is required to prevent the electrolytic solution from leaking out or evaporating. Accordingly, a sealant is provided between the metal case and the sealing body, or between the gasket and the metal case or the sealing body.

Further, the sealant may contain a pigment, a dye and the like in order to improve visibility. For example, Patent Literature 1 discloses a sealant containing an inorganic pigment, and Patent Literature 2 discloses a sealant containing phthalocyanine blue which is an organic pigment.

CITATION LIST

Patent Literature

Patent Literature 1: JP 2003-268293 A
Patent Literature 2: JP 2007-273480 A

SUMMARY OF INVENTION

Technical Problem

However, the color tones of the sealants disclosed in Patent Literatures 1 and 2 are dark, and therefore, the colors of the sealants have been difficult to be distinguished from the color of their gaskets or metal cases, and they have been difficult to be confirmed by visual observation or by means of a sensor. In particular, when the sealant is used by being applied as a thin film as thin as 20 μm or less, visibility has not been able to be ensured unless a large amount of the pigment is admixed. In addition, when a large amount of the pigment is admixed, there has been a problem that the seal efficiency tends to be decreased because the film tends to be hardened.

The present invention is made in view of the above-described conventional problems, and an object of the present invention is to provide a sealant composition for a nonaqueous electrolyte cell in which the application position and uniformity of applied film thickness of the sealant can be visually confirmed even when being applied as a thin film, and having excellent durability (electrolyte resistance) in relation to various electrolytic solutions used in the cell.

Solution to Problem

The present inventors have conducted intensive studies in order to solve the problems described above, and as a result, have found that the above problems can be solved by using a specific sealant composition, and thus completed the present invention.

The gist of the present invention is described below.
[1] A sealant composition for a nonaqueous electrolyte cell, the composition including: (A) an elastomer; and (B) a cobalt blue colorant, wherein the component (B) has a content of 0.1-20 mass parts with respect to 100 mass parts of the component (A).
[2] The sealant composition for a nonaqueous electrolyte cell according to [1], wherein the component (A) is at least one kind of an elastomer selected from the group consisting of a butyl rubber, an isobutylene rubber, a butadiene rubber, an ethylene-propylene rubber and an ethylene-propylene-diene rubber.
[3] The sealant composition for a nonaqueous electrolyte cell according to [1] or [2], wherein the component (B) is at least one of $CoAl_2O_4$ or $CoO.Al_2O_3$.
[4] The sealant composition for a nonaqueous electrolyte cell according to any one of [1] to [3], wherein the component (B) has a mean particle diameter of 0.01-100 μm and a specific gravity of 2.0-6.0 $g/cm^3$.
[5] The sealant composition for a nonaqueous electrolyte cell according to any one of [1] to [4], further including (C) an organic solvent.
[6] A nonaqueous electrolyte cell including: an element unit in which a pair of electrodes are disposed to face each other with a separator therebetween; a nonaqueous electrolytic solution; and a container for accommodating them, wherein the container includes a metal case having an opening and a sealing body for sealing the opening, a seal portion is provided at least a part between the metal case and the sealing body, and the seal portion includes the sealant composition for a nonaqueous electrolyte cell according to any one of [1] to [5].

Advantageous Effect of Invention

The sealant composition according to the present invention can reduce the fraction defective of sealing and greatly contributes to the increase in productivity because the application position and uniformity of applied film thickness of the sealant can be confirmed by visual observation even when being applied as a thin film, due to the improvement of visibility. In addition, the sealant composition according to the present invention has excellent durability in relation to various electrolytic solutions used in the cell, and therefore, the sealant composition according to the present invention can maintain performance of the cell, and can greatly improve safety.

DESCRIPTION OF EMBODIMENTS

The present invention is explained in detail hereinbelow. In the present specification, a sealant composition for a nonaqueous electrolyte cell may be referred to simply as "a sealant composition" or "a sealant".

Examples of an elastomer which is a component (A) used for the present invention include, for example, but are not limited to, an isobutylene-isoprene copolymer (a butyl rubber), a butadiene rubber, a styrene-butadiene rubber, an isoprene rubber, a natural rubber, a piperylene rubber, a nitrile rubber, a 1,3-pentadiene rubber, an isobutylene rubber, an ethylene-propylene rubber, an ethylene-propylene-diene rubber, an urethane rubber, a silicone rubber, an acryl rubber, a chlorosulfonated polyethylene rubber, a fluorine rubber, an ethylene-vinyl acetate copolymer rubber and the like. Among the above, a butyl rubber, an isobutylene rubber, a butadiene rubber, an ethylene-propylene rubber, and an ethylene-propylene-diene rubber are preferable, and a butyl rubber, an ethylene-propylene rubber, an ethylene-propylene-diene rubber are more preferable, because the component (B) described below tends to be homogeneously dispersed to the resulting composition easily and the resulting composition tends to be excellent in electrolyte resistance. Meanwhile, they may be used alone or two or more kinds of them may be mixed to be used together.

Examples of a cobalt blue colorant which is a component (B) used for the present invention include $CoAl_2O_4$, $CoO.Al_2O_3$ and the like. The mean particle diameter of the component (B) is preferably 0.01-100 μm, more preferably 0.05-50 μm and particularly preferably 0.1-20 μm. When the mean particle diameter is 0.01 μm or more, visibility of the sealant tends to improve and when the mean particle diameter is 100 μm or less, excellent seal efficiency tends to be exhibited. Meanwhile, in the present specification, a mean particle diameter means a primary particle diameter and the value D50 measured by using a laser diffraction apparatus is employed as a mean particle diameter. In addition, the specific gravity of the component (B) is preferably in the range of 2.0-6.0 $g/cm^3$ in terms of the prevention of precipitation of the component (B) after storing the composition. Meanwhile, in the present specification, a value measured according to a method of JIS K 5101 is employed as a specific gravity.

Examples of a commercial product used as the component (B) include, for example, 42-216A, 42-218A, 42-219A, 42-250A (manufactured by Tokan Material Technology Co., Ltd.) and the like.

In addition, the ratio of the component (B) with respect to 100 mass parts of the component (A) is preferably 0.1-20 mass parts, more preferably 0.3-15 mass parts, and particularly preferably 0.5-10 mass parts. When the ratio of the component (B) with respect to 100 mass parts of the component (A) is 0.1 mass part or more, visibility of the sealant tends to be improved, and when the ratio of the component (B) with respect to 100 mass parts of the component (A) is 20 mass parts or less, stable visibility tends to be ensured because the component (B) tends not to be precipitated even when the sealant composition is stored for long time at room temperature.

An organic solvent which is a component (C) used for the present invention may be added to the sealant composition such that the concentrations of the component (A) and the component (B) described above and the like in the sealant composition are appropriately adjusted. Examples of the component (C) include, but are not limited to, an aliphatic hydrocarbon-based organic solvent, an aromatic hydrocarbon-based organic solvent, an alicyclic hydrocarbon-based organic solvent, an alcohol-based organic solvent, an aldehyde-based organic solvent, a ketone-based organic solvent, an ester-based organic solvent, an ether-based organic solvent, a halogenated hydrocarbon-based organic solvent, a petroleum-based organic solvent, and the like. Among the above, an aromatic hydrocarbon-based organic solvent, an alicyclic hydrocarbon-based organic solvent, a halogenated hydrocarbon-based organic solvent, a petroleum-based organic solvent and the like are preferable, and an aromatic hydrocarbon-based organic solvent, an alicyclic hydrocarbon-based organic solvent, a petroleum-based organic solvent and the like are particularly preferable in terms of the excellent compatibility with the component (A) or the component (B) used for the present invention. More specific examples of the component (C) include, benzene, methylbenzene, ethylbenzene, toluene, xylene, n-hexane, cyclohexane, methylcyclohexane, ethylcyclohexane, nonane, decane, decalin, dodecane, gasoline, industrial gasoline, solvent naphtha and the like, and they may be used alone or two or more kinds of them may be mixed to be used together.

Meanwhile, the boiling point of the component (C) is preferably 70-200° C., and more preferably 80-170° C. in terms of compatibility with the component (A) or the component (B) and of good working properties upon manufacturing or using the sealant composition. In addition, the ratio of the component (C) with respect to 100 mass parts of the component (A) is preferably 1-50,000 mass parts, more preferably 3-30,000 mass parts, and particularly preferably 5-10,000 mass parts.

If necessary, an additive which includes a crosslinking agent such as an initiator of radical polymerization, a filler such as fumed silica, quartz powder and calcium carbonate, a corrosion inhibitor, a silane coupling agent, a tackifier such as a terpene-based resin, a petroleum-based aliphatic resin and a petroleum-based alicyclic resin, a plasticizer, a thixotropy-imparting agent, an antioxidant, an ultraviolet absorber, a light stabilizer, a flame retarder and a surfactant may be added to the sealant composition as long as the additive does not impair the properties of the sealant composition according to the present invention. The additive is added in an appropriate amount depending on the desired physical property.

The total amount of the component (A) and the component (B) contained in the sealant composition according to the present invention in relation to 100 mass % of the solid component amount of the sealant composition is preferably 50 mass % or more, more preferably 70 mass % or more, even more preferably 90 mass % or more, and the most preferably 100 mass % such that the sealant composition exhibits its performances sufficiently.

The sealant composition according to the present invention is suitably used for sealing a nonaqueous electrolyte cell. In general, a nonaqueous electrolyte cell includes an element unit in which a pair of electrodes are disposed to face each other with a separator therebetween; a nonaqueous electrolytic solution; and a container for accommodating them. This container includes a metal case having an opening, and a sealing body for sealing the opening. Moreover, a gasket is sometimes interposed between the metal case and the sealing body. Further, examples of the nonaqueous electrolyte cell include a lithium-ion battery and the like, and examples of the shape of the nonaqueous electrolyte cell include, but are not limited to, a cylindrical shape, a coin shape, a sheet shape, and the like.

In addition, specific examples of a solvent used as a nonaqueous electrolytic solution include, but are not limited to, γ-butyrolactone, propylene carbonate, dimethoxyethane, ethylene carbonate, dimethyl carbonate, ethyl methyl carbonate, diethyl carbonate, dimethyl sulfoxide, acetonitrile, tetrahydrofuran, and the like. Further, they may be used alone or two or more kinds of them may be mixed to be used together.

Furthermore, examples of a material constituting the gasket used for the nonaqueous electrolyte cell include, but are not limited to, a polybutyrene terephthalate resin, a polyamide resin, a polyether ether ketone resin, a polyphenylene sulfide resin, an EPDM, a polypropylene, and the like.

The sealant composition according to the present invention is suitably used for overcoat sealing of caulking portions of the metal case and of the sealing body of the nonaqueous electrolyte cell, as well as for sealing a space between the metal case and the sealing body, a space between the gasket and the metal case or the sealing body, and the like. Preferably, examples of the use of the sealant composition according to the present invention include sealing a space between the metal case and the sealing body, a space between the gasket and the metal case or the sealing body, and the like. In other words, according to one embodiment of the present invention, a nonaqueous electrolyte cell, which has a seal portion in at least a part of a space between a metal case and a sealing body, and of which the seal portion contains the above-described sealant composition (solid content), is provided. When a gasket is interposed between the metal case and the sealing body, at least a part of a seal portion between the metal case and the gasket and/or of a seal portion between the sealing body and the gasket contains the above-described sealant composition, among the spaces between the metal case and the sealing body.

EXAMPLES

The components used for Examples and Comparative Examples of the present invention are as follows.

[Components (A)]

a-1: JSR Butyl 65 (a butyl rubber, manufactured by JSR Corporation)

a-2: EP33 (an ethylene-propylene-diene copolymer rubber, manufactured by JSR Corporation)

[Components (B)]

b-1: 42-250A ($CoAl_2O_4$, mean particle diameter: 0.8 μm, specific gravity: 4.1 g/cm³, manufactured by Tokan Material Technology Co., Ltd.)

b-2: 42-216A ($CoAl_2O_4$, mean particle diameter: 1.0 μm, specific gravity 4.0 g/cm³, manufactured by Tokan Material Technology Co., Ltd.)

[Comparative Components to Components (B)]

b'-1: phthalocyanine blue b'-2: ultramarine (mean particle diameter: 3.8 μm)

[Component (C)]

c-1: 50:50 (mass ratio) mixture of ethylbenzene (boiling point: 136° C.) and o-xylene (boiling point: 144° C.)

[Preparation of Compositions of Examples 1 to 4 and Comparative Examples 1 to 3]

Components (A) to (C) were added at a mass ratio shown on Table 1, and they were mixed under stirring at room temperature to prepare a sealant composition.

TABLE 1

| Component | | Example 1 | Example 2 | Example 3 | Example 4 | Comparative Example 1 | Comparative Example 2 | Comparative Example 3 |
|---|---|---|---|---|---|---|---|---|
| a-1 | | 100 | 100 | | 100 | 100 | 100 | 100 |
| a-2 | | | | 100 | | | | |
| b-1 | | 1 | 3 | 1 | | | | |
| b-2 | | | | | 1 | | | |
| b'-1 | | | | | | | 3 | |
| B'-2 | | | | | | | | 3 |
| c-1 | | 1000 | 1000 | 1000 | 1000 | 1000 | 1000 | 1000 |
| Visibility confirming test of a thin film | | ○ | ○ | ○ | ○ | x | x | x |
| Electrolyte resistance test | Dimethoxyethane | ○ | ○ | ○ | ○ | ○ | △ | x |
| | Propylene carbonate | ○ | ○ | ○ | ○ | ○ | ○ | x |
| | γ-butyrolactone | ○ | ○ | ○ | ○ | ○ | ○ | △ |
| | Ethyl methyl carbonate | ○ | ○ | ○ | ○ | ○ | ○ | x |
| | Dimethyl carbonate | ○ | ○ | ○ | ○ | ○ | ○ | x |

[Visibility Confirming Test of a Thin Film]

Each of sealant compositions was applied on a gray colored gasket made of polypropylene, and the gasket was left at room temperature for 60 minutes, and then the gasket was dried at 60° C. for one hour to form a film with a thickness of about 20 μm. The visibility of this film was evaluated by visual observation based on the following evaluation criteria. The results are shown on Table 1.

<Evaluation Criteria>

○: Visible x: Invisible.

[Electrolyte Resistance Test]

On a glass plate, 0.1 g of each of the sealant compositions was applied, and the grass plate was left at room temperature for 60 minutes and then the grass plate was dried at 60° C. for one hour to give a film with a thickness of 20 μm. The film was soaked in a solvent used as a nonaqueous electrolytic solution, which is dimethoxyethane, propylene carbonate, γ-butyrolactone, ethylmethyl carbonate or dimethyl carbonate, at 60° C. for 7 days, respectively. The masses of the film before and after soaking were measured, and the mass change was calculated based on the following equation, and then the results obtained by evaluating based on the following evaluation criteria are shown on Table 1.

$$\Delta W = ((W2-W1)/W1) \times 100$$

ΔW: mass change (%)
W1: mass of film before soaking
W2: mass of film after soaking
<Evaluation Criteria>
○: The absolute value of mass change was 5 or less;
Δ: The absolute value of mass change was greater than 5 and 10 or less;
x: The absolute value of mass change was greater than 10.

As shown on Table 1, with regard to Comparative Examples 2 and 3 in which phthalocyanine blue or ultramarine was used as a pigment, the mass change (in particular, mass loss) due to soaking was observed. It is thought that this is caused by the elution of the pigment contained in the sealant composition into solvent, and that there are possibilities that cell characteristics are impaired by the elution of the pigment into an electrolytic solution as well as that some failures such as impaired sealing performance of a cell due to emaciation of the seal portion occur.

INDUSTRIAL APPLICABILITY

The sealant composition according to the present invention is able to decrease the fraction defective of sealing due to improved visibility, even when being applied as a thin film, and thus greatly contributes to the increase in productivity. In addition, the sealant composition according to the present invention has excellent durability in relation to various electrolytic solutions used in the cell, and therefore, is able to maintain cell characteristics and to improve safety greatly.

The invention claimed is:

1. A sealant composition of a nonaqueous electrolyte cell, the composition comprising: (A) an elastomer, where said elastomer is at least one of an isobutylene-isoprene copolymer (a butyl rubber) and an ethylene-propylene-diene rubber; and
   (B) a cobalt blue colorant, wherein the component (B) has a content of 0.1-20 mass parts with respect to 100 mass parts of the component (A).

2. The sealant composition of a nonaqueous electrolyte cell according to claim 1, wherein the component (B) is at least of one of the formulas $CoAl_2O_4$ or $CoO \cdot Al_2O_3$.

3. The sealant composition of a nonaqueous electrolyte cell according to claim 1, wherein the component (B) has a mean particle diameter of 0.01-100 μm and a specific gravity of 2.0-6.0 $g/cm^3$.

4. The sealant composition of a nonaqueous electrolyte cell according to claim 1, further comprising (C) an organic solvent.

5. A nonaqueous electrolyte cell comprising: an element unit in which a pair of electrodes are disposed to face each other with a separator therebetween; a nonaqueous electrolytic solution; and a container for accommodating them, wherein
   the container comprises a metal case having an opening and a sealing body for sealing the opening,
   a seal portion is provided at least a part between the metal case and the sealing body, and
   the seal portion comprises the sealant composition for a nonaqueous electrolyte cell according to claim 1.

* * * * *